United States Patent
Sutton

[11] 3,822,844
[45] July 9, 1974

[54] PARACHUTE

[75] Inventor: Stephen John Sutton, Islington, Ontario, Canada

[73] Assignee: Jack Sutton, Islington, Ontario, Canada

[22] Filed: June 25, 1973

[21] Appl. No.: 373,434

[52] U.S. Cl. .............................................. 244/145
[51] Int. Cl. ........................................... B64d 17/02
[58] Field of Search ........... 244/152, 145, 146, 142; 46/86 R, 86 A, 86 B, 86 C; 114/102, 103

[56] References Cited
UNITED STATES PATENTS

| | | | |
|---|---|---|---|
| 2,096,520 | 10/1937 | Knight | 244/145 |
| 2,409,562 | 10/1946 | Hastings | 244/145 |
| 3,035,798 | 5/1962 | Brinkmann | 244/152 |
| 3,131,894 | 5/1964 | Jalbert | 244/152 |
| 3,524,613 | 9/1970 | Reuter | 244/142 |

*Primary Examiner*—Robert J. Spar
*Assistant Examiner*—G. L. Anton

[57] ABSTRACT

This invention relates to a parachute of the ram air canopy type wherein a canopy is made from a skin formed into a series of elongated, inflatable parallel cells disposed in side-by-side relation to constitute an airfoil when inflated. The inventive concept of the application is the formation of openings in the top and in the bottom wall of each of the cells to form an air passage. These air passages in the bottom and in the top walls of the cells are of greatest capacity in the two outside cells and become of progressively smaller capacity towards the centre of the airfoil. Adjacent cells in the airfoil are in communication with each other through a port in their common wall. The combinaion of passages in the top and the bottom wall of each cell as aforesaid and the port between adjacent cells greatly improves the stability of the parachute, especially under conditions of vertical descent.

2 Claims, 9 Drawing Figures

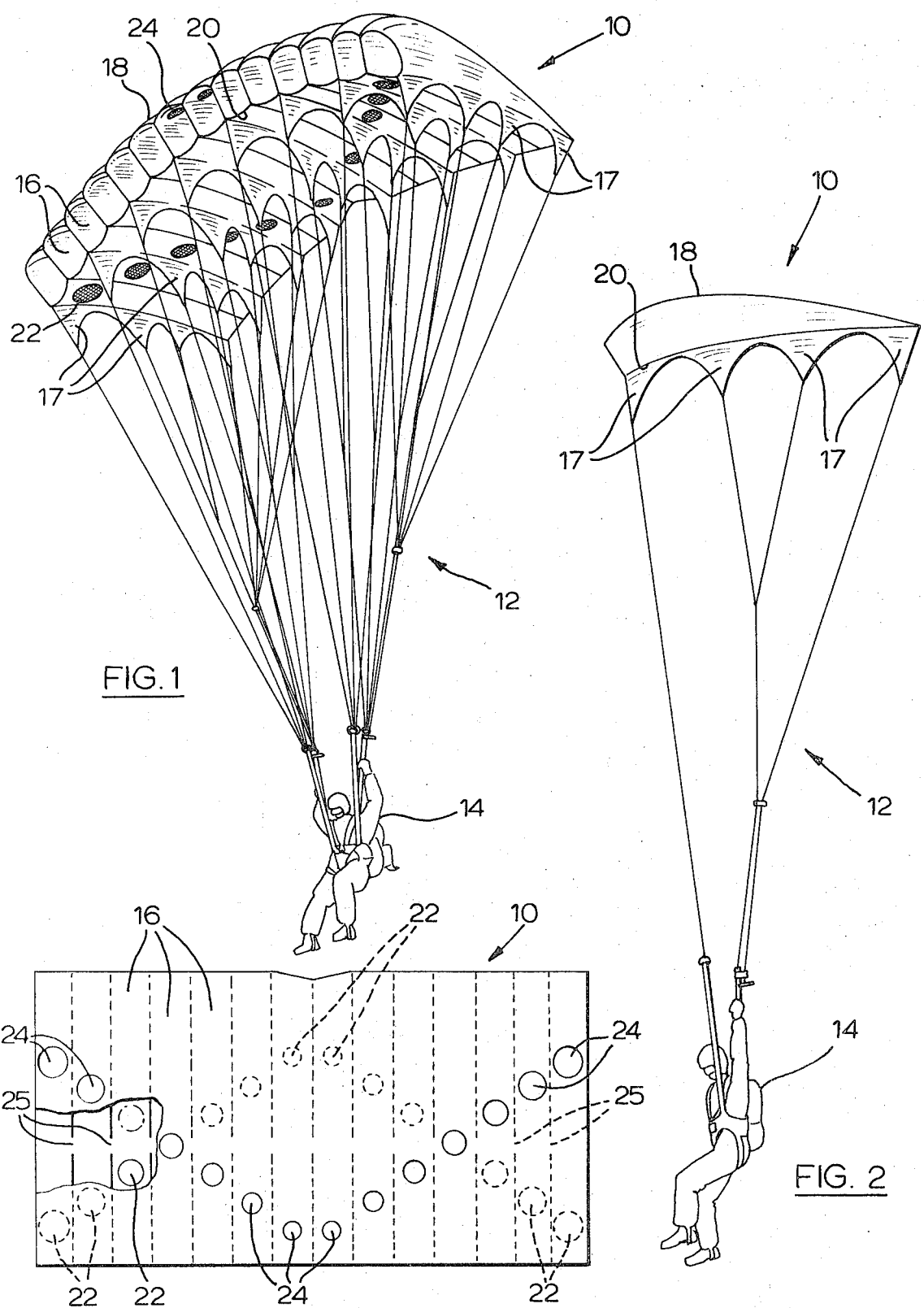

PATENTED JUL 9 1974 3,822,844

PARACHUTE

This invention relates to a parachute having a ram-air canopy. Parachutes having a canopy made from a skin formed into a series of elongated inflatable parallel cells disposed in side by side relation to constitute an airfoil when inflated are well known. Each of the cells is open at its front end whereby to provide for the admission of inflating air thereto, in flight. The open ends are the leading edge of an airfoil and the "ramming" or compressing of the air provides the inflation to form and retain the airfoil shape of the canopy.

The large surface area to low mass weight of the canopy sets up a "drag" which reduces the rate of descent of the payload which has a small surface and high mass weight. In addition to this drag, however, there is a lifting force derived by the passage of air over and under the airfoil shaped canopy which gives a "flight" characteristic.

Parachutes of this general type are manoeuverable so long as an air speed can be maintained. There is little difficulty in achieving a steady rate of descent of about 14 feet per second at an air speed of 25 m.p.h. However, for complete control it is often desirable to descend with less forward motion and the chutist has flight control means which permit him to stall or near stall the airfoil whereby to cause loss of forward motion. Such a manoeuver is a very useful one from a control point of view because it permits nearly vertical or increased rate of descent but it can be dangerous because in such a condition the canopy tends to fall uncontrollably to the right, to the left or back leaving the parachutist in an uncontrollably increasing rate of descent.

This invention provides a means for reducing the rate of descent of a ram-air parachute under conditions of braking and nearly vertical descent, without materially affecting its manoeuverability under conditions of full forward flight.

Generally speaking a parachute according to this invention comprises a canopy, suspension lines extending from said canopy, said canopy comprising a skin formed in a series of elongated inflatable parallel cells disposed in side by side relation to constitute an airfoil when inflated, said cells being open at their front ends whereby to provide for the admission of inflating air thereto in use, said front ends of said cells, forming the leading edge of said airfoil, said cells each having a top wall and a bottom wall joined by side walls, said top walls of said cells forming the upper surface of said airfoil, said bottom walls of said cells forming the bottom surface of said airfoil, said bottom walls being formed with an air passage, said top walls being formed with an air passage, said air passages in said bottom walls and said air passages in said top walls constituting a passage for air through their respective cells effective under conditions of substantially vertical descent of said canopy to stabilize the descent of said parachute. The invention will be clearly understood after reference to the following detailed specification read in conjunction with the drawings.

In the drawings:

FIG. 1 is a perspective view of a parachute according to this invention with the canopy in full flight;

FIG. 2 is a side view of FIG. 1;

Figure 3:
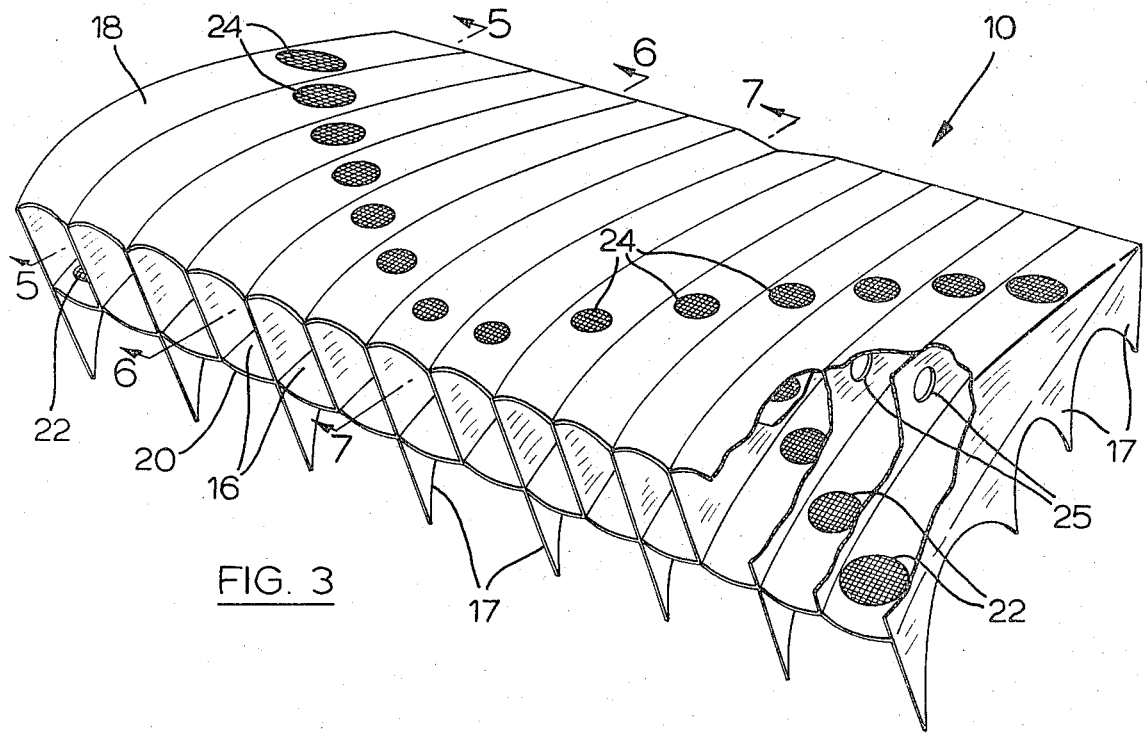
FIG. 3 is an illustration of the canopy partly broken away to illustrate the leading edge and the air passage which are formed therein and which will be described in the specification.
Figure 5:
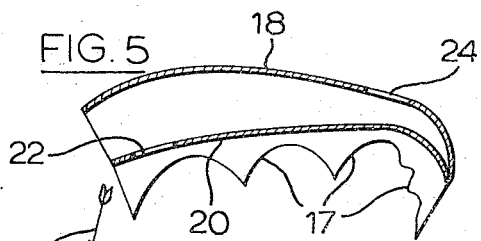
Figure 6:
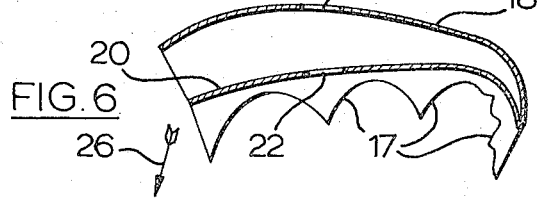
Figure 8:
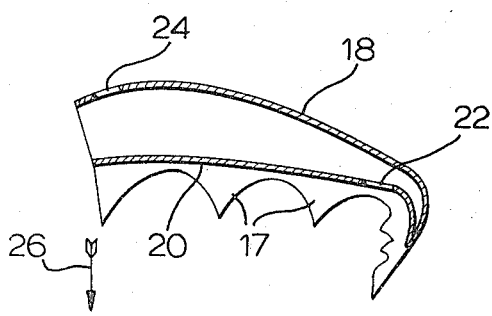
Figure 7:
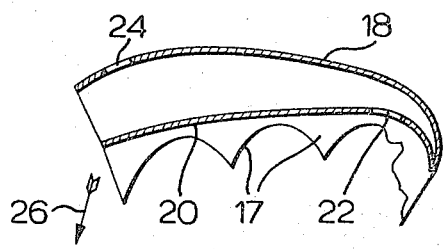

FIGS. 5, 6 and 7 are views taken along the lines 5, 6 and 7 of FIG. 3 showing the canopy under conditions of braking;

FIG. 8 is a view similar to FIG. 5 showing the cross-section of the canopy in a stall position; and FIG. 9 is a plan view of the canopy illustrating the relative arrangement of the vents.

The parachute illustrated in the drawings has a canopy generally indicated by the numeral 10 and suspension lines generally indicated by the numeral 12 extending therefrom for supporting a parachutist 14 or other load.

The canopy 10 is made from a skin of substantially air impervious material formed into a series of elongated cells 16 disposed in side by side relation to constitute an airfoil when inflated as illustrated in FIGS. 1, 2 and 3. It will be appreciated that the parachute is folded according to usual practice and that it inflates as illustrated in use. Parachutes of the type under consideration are often called ram-air parachutes because their airfoil shape is achieved by the ramming or compressing of air into the cells 16 through the open forward ends of the cells.

The trailing edge of the canopy is substantially sealed to insure the maintenance of the pressurized inflating force within the cells. In some cases, however, slight venting at the rear edge is provided depending upon the particular design of the canopy.

Figure 4:
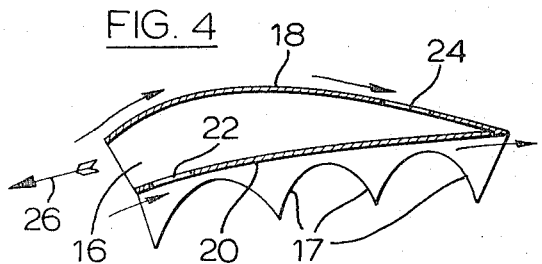
FIG. 4 is a sectional view of the canopy under full flight.

In FIGS. 1 and 2, the parachute has been illustrated in full flight. It will be noted that the trailing edge of the airfoil is fully up. Under such conditions a parachute of this type has a forward air speed. FIG. 4 is a longitudinal cross-section through one of the cells 16 illustrating the passage of air across the upper and lower surfaces of the airfoil, in a manner that develops lift in the same fashion as a typical aircraft wing. Under such conditions of forward flight it is possible to turn the chute in either direction by depressing the toggle that controls the flap on one side or the other to cause sufficient drag to turn the parachute. Numeral 17 refers to downwardly depending flare stabilizers which extend from the side walls of the cells and connect with the suspension lines.

It is also possible to brake the forward speed by depressing the toggles that control the height of the trailing edge of the airfoil and in this connection the rear two control lines each control one half of the trailing edge. Both control toggles would be depressed simultaneously to uniformly lower the trailing edge of the airfoil as illustrated in FIGS. 5, 6 and 7. Under these conditions the parachute loses forward air speed and descends in a nearly vertical path.

It is under conditions of braking and stalling that the present invention is useful. The present invention includes openings in the top walls 18 and bottom walls 20 of the cells 16 designed to constitute a passage for air through their respective cells that is effective under conditions of substantially vertical descent of the airfoil to stabilize and slow up the descent of the parachute.

FIG. 5 is a cross-section of an outside cell 16. The bottom wall 20 is formed with an opening 22 adjacent its forward end and top wall 18 is formed with an opening 24 adjacent its back end. Under conditions of vertical drop as indicated by the arrow 26 air is forced through opening 22 to cause a build up of pressure within the cell due to the descent that retards the rate of descent. The air that is guided through the cells 16 under these conditions would in the absence of the opening 22 and 24 spill from the edges of the airfoil with little or no buoyant effect on the parachute. By providing for a build up of pressure due to the passage of air through the cells, an increased drag effect is achieved under conditions of substantially vertical descent. Under conditions of forward flight as illustrated in FIG. 4 of the drawings, venting through passages 22 and 24 is negligible.

It will be noted that the location of the holes similar to holes 22 and 24 varies from cell to cell. FIG. 6 is an illustration through a cell midway between the center of the airfoil and the outer edge. It will be noted that in this case, the holes in the lower wall 22 and the upper wall 18 are substantially aligned with each other and in the case of these holes, the air substantially passes in a vertical direction therethrough.

FIG. 7 is an illustration showing the location of the holes adjacent the center of the airfoil and it will be noted that in this case the air can enter through a hole in the bottom wall 22 that is near the back of the airfoil and leave the airfoil through a hole that is located adjacent the leading edge of the top wall 18 of the airfoil.

Adjacent cells have a cross vent port 25 in their common wall so as to tend to equalize the pressure in the cells across the airfoil. Cross vent ports 25 are located midway of the length of the airfoil exclusive of the flap portion.

The arrangement of the openings 22 qnd 24 on the lower and the upper surface of the airfoil is illustrated in FIG. 3. It will be noted that the holes 22 on the under side of the airfoil are arranged in a V shape with the apex of the V adjacent the rear of the airfoil and that the holes 24 in the upper surface of the airfoil are arranged in a V shape of similar height with the apex of the V adjacent the front end of the airfoil. Cross vent ports are located midway of the height of the V shapes. The relationship of the V formation and the cross vents is illustrated in FIG. 9. The flap area is the area behind the V formation.

It will also be noted that the vent holes are largest in the cells adjacent the two outside edges of the airfoil and that they decrease gradually towards the center cells of the airfoil.

This arrangement tends to increase the pressure in the outside cells the most.

It is difficult to be precise or isolate the effects of the individual venting holes in each of the cells. It will be recalled that the cells communicate with each other through the wall vents and that there is a certain amount of evening off of pressure within the cells.

The vent openings 22 and 24 have a screen mesh thereover so that air passes over them as indicated in FIG. 4 under conditions of normal flight.

FIG. 8 illustrates the section of a cell with the trailing edge of the airfoil depressed to a greater extent than it is in FIGS. 5 and 7. It is approaching a stall and under these conditions the descent is substantially vertical so that the drag effect achieved by the passage of air through the openings 22 and 24 is increased over and above that to what is illustrated in FIGS. 5 to 7.

Under all conditions the cells remain inflated and in order to remove the parachute from its brake or stalled condition, it is merely necessary to remove the tension on the trailing edge by loosening the rear control lines. The airfoil will again assume the position illustrated in FIG. 4 and recommence full flight.

The vent holes 22 and 24 are largest at the outer arms of the V shapes and reduce gradually to about half size at the apex of the V shapes. They will range from say 15 inches to 7 and one-half inches in size but will vary depending on the load and size of the airfoil.

What I claim as my invention is:

1. In a parachute, a canopy, suspension lines extending from said canopy, said canopy comprising a skin formed in a series of elongated inflatable parallel cells disposed in side by side relation to constitute an airfoil when inflated, said cells being open at their front ends whereby to provide for the admission of inflating air thereto in use, said front ends of said cells forming the leading edge of said airfoil, said cells each having a top wall and a bottom wall joined by side walls, said top wall of said cells forming the upper surface of said airfoil, said bottom walls of said cells forming the bottom surface of said airfoil, control means for controlling the height of the trailing edge of said airfoil in flight, said bottom walls being formed with an air passage, said top walls being formed with an air passage, said air passages in said bottom walls and said air passages in said top walls constituting passage for air through their respective cells effective under conditions of substantially vertical descent of said canopy to stabilize and retard the descent of said parachute, said air passages in said bottom walls being of greatest capacity in the two outside cells and becoming of progressively smaller capacity towards the centre area of the airfoil, said air passages in said top walls being of greatest capacity in the two outside cells and becoming of progressively smaller capacity towards the centre area of the airfoil, adjacent cells in said airfoil being in communication with each other through a port in their common wall, the air passages in the top wall and the bottom wall of said cells being spaced apart longitudinally of their respective cells in at least most of said cells.

2. In a parachute as claimed in claim 1 in which said air passages in said bottom walls of adjacent cells are arranged in V shape with the apex of said V adjacent the rear of said airfoil and in which said air passages on said top wall of adjacent cells are arranged in a V shape with the apex of the V adjacent the front of said airfoil.

* * * * *